Jan. 3, 1961   E. N. WOOD   2,966,919
RADIATOR DEVICE

Filed May 16, 1957   2 Sheets-Sheet 1

INVENTOR.
Everett N. Wood
BY
Marvin Moody

Jan. 3, 1961 E. N. WOOD 2,966,919
RADIATOR DEVICE
Filed May 16, 1957 2 Sheets-Sheet 2

INVENTOR.
Everett N. Wood
BY
Marvin Moody

United States Patent Office

2,966,919
Patented Jan. 3, 1961

2,966,919

RADIATOR DEVICE

Everett N. Wood, 1609 Wildwood Drive NE., Cedar Rapids, Iowa

Filed May 16, 1957, Ser. No. 659,642

5 Claims. (Cl. 137—102)

This invention relates in general to cooling systems for engines and in particular, to a radiator device for preventing overheating.

This invention is an improvement of a system described in my United States Patent Number 2,672,131 which is entitled Cooling System and which issued on March 16, 1954. As shown and discussed in that patent, internal combustion engines such as used in automobiles, trucks, and diesel locomotives are generally cooled by liquid. Liquid coolant is circulated through the engines adjacent the combustion chambers to remove the heat generated therein and is then circulated through a radiator where the heat removed before recirculation. As the coolant heats it expands and thus a portion of the coolant is lost through the conventional overflow pipe. When the engine cools down, it sucks coolant to a lower level in a very fast manner and oftentimes draws a mixture of liquid and air into the engine. Such air causes "hot spots" in the engine. This aeration causes the engine to overheat and often results in loss of a large amount of the coolant fluid due to violent thermal reaction.

The system described and claimed in my Patent Number 2,672,131 solves this problem by providing a pair of tanks which hold the coolant and in which a demand for more coolant in the engine is satisfied in a manner which prevents aeration of the coolant. Reference to this patent should be made for a more thorough detail description of the operation of that system.

The present invention is an improvement on the system of Patent Number 2,672,131 wherein the filler cap and related structure have been substantially modified so as to produce a more efficient and better apparatus An object is to provide a pressurized filler cap for a cooling system.

A feature of this invention is found in the provision for a filler cap which covers three openings in an engine cooling system. Another feature is found in the provision for a filler cap which covers two openings in an engine cooling system.

Further objects, features, and advantages will become apparent for those reading the following description and claims in view of the drawings, in which—

Figure 1:
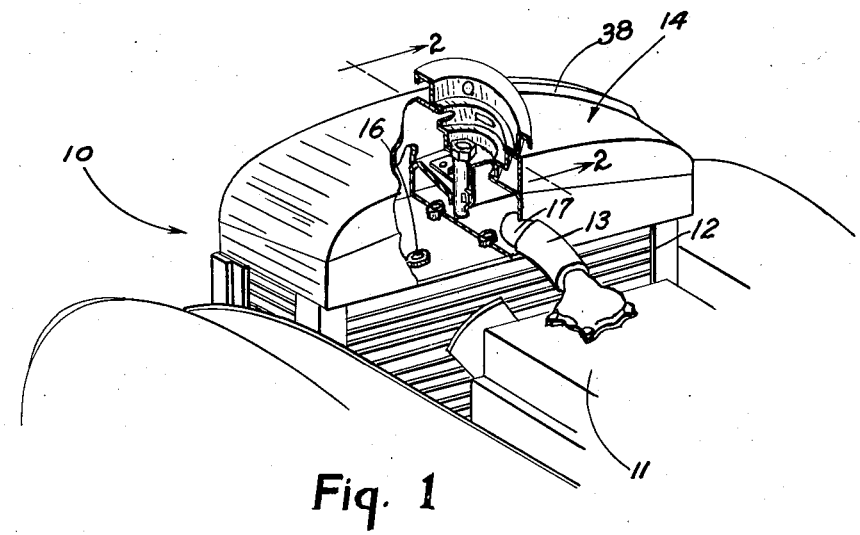
Figure 1 illustrates a portion of the front end of an automobile with a radiator installed and with a portion of the radiator cut-away.
Figure 2:
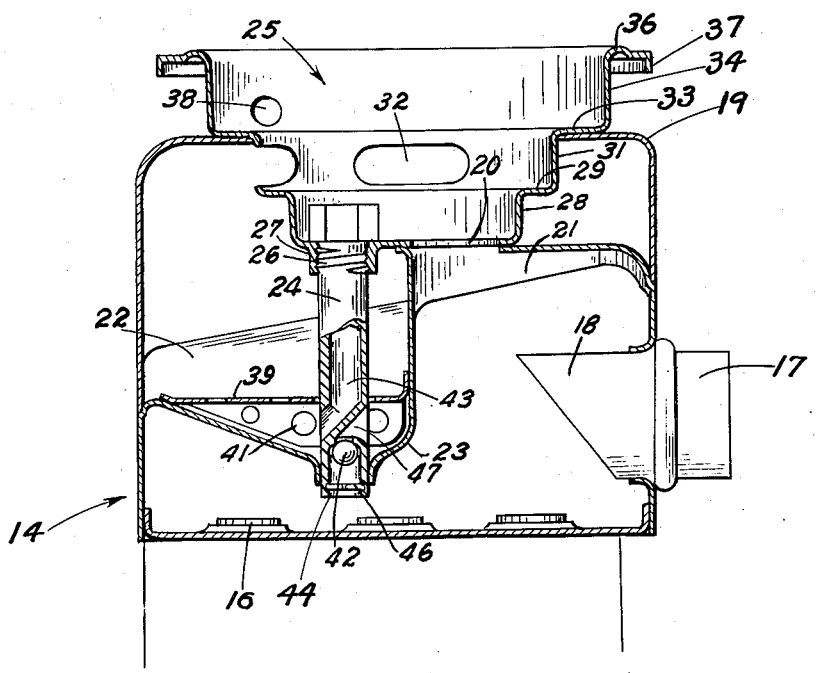
Figure 2 is a sectional view of the radiator shown in Figure 1 and with the cut of the section taken through the filler neck.

Figure 1 illustrates the front end of a car, designated generally as 10, and which has an engine 11 and a radiator 12. A hose 13 connects the upper portion of the radiator 14 to the engine. As best shown in Figure 2 a coupling 17 attaches to the hose 13 and has an inwardly extending portion 18 that extends into the portion 14 of the radiator.

Tubes 16 extend through the radiator core from the bottom of the tank portion 14 of the radiator. The tank portion 14 is divided by a partition 21 which is generally horizontal but which has a lower portion 22.

A filler neck portion designated generally as 25 has a lower portion 28 that connects to the partition 21. An opening 20 is formed in the bottom of the filler neck 25 to allow fluid to flow between the filler neck and the lower reservoir which communicates with the tubes 16. A horizontal ledge 29 is connected to the portion 28 and is attached to a vertically extending portion 31 that extends upwardly through the wall 19 of the tank 14. A plurality of openings 32 are formed in the portion 31 to allow fluid communication between the filler neck 25 and the surge tank which forms the upper portion above the partition 21—22. A larger horizontal portion 33 is attached to the top of the tank 14 by welding or other suitable means and an upwardly extending cylindrical portion 34 is attached to portion 33 and has a lip 36 to which a rim 37 is attached. An overflow pipe 38 is connected to the portion 34. Between the bottom of the portion 28 of the filler neck and extending to the lower portion of the partition 22 is a tube 24 which comprises a top threaded portion 26 which is threadedly received in a collar 27 that is attached to the bottom of portion 28. The tube 24 has a first outlet 43 that communicates with the surge tank. The surge tank has a lower extending portion 23 that forms a part of the partition 22 and which engages the tube 24 below the opening 43. A baffle member 39 is formed with a plurality of holes 41 so as to substantially eliminate aeration effects.

A lower opening 44 of the tube communicates with the lower reservoir and a ball valve 42 which has a specific gravity about the same as the cooling fluid is mounted in the tube above the opening 44 and is prevented from coming out of the opening 44 by a retaining spring 46. An opening 47 above the ball valve 42 allows communication between the surge tank and the reservoir when negative pressure exists between them.

Figure 3:
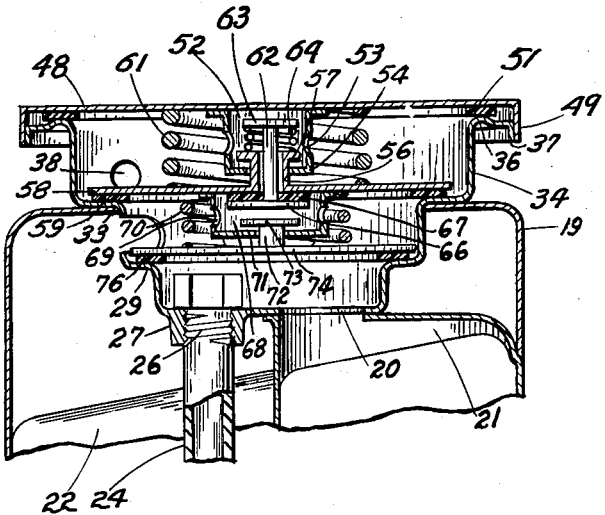
Figure 3 illustrates the upper section of the radiator of Figure 1 in section with a pressurized filler cap installed therein.

Figure 3 illustrates a pressure system with a suitable filler cap mounted therein.

The cap has a lid 48 which has a downwardly extending portion 49 that may be locked to the rim 37 of the filler neck. A rubber gasket 51 is attached to the bottom of the portion 48 to produce a seal between the lip 36 and the cap. A cylinder 52 is attached to the lid 48 and is formed with openings 53. The lower portion of the cylinder 52 is formed with a horizontal portion 54 which has a central opening through which a hollow shaft 56 extends. The upper portion 57 of the shaft 56 is enlarged and will not pass through the opening in the bottom 54. A disc 58 is attached to the shaft 56 and carries a rubber gasket 59 which engages the portion 33 of the filler neck. A spring 61 surrounds the cylinder 52 and is mounted between the lid 48 and the disc 58 so as to hold the gasket 59 firmly against the seat 33. A central opening is formed through the shaft 56 and the disc 58 and a shaft 62 extends therethrough. The upper end of shaft 62 carries a small disc 63 which is biased upwardly by a spring 64 mounted between the disc 63 and the portion 57. A disc 66 is attached to the lower end of shaft 62 and is provided with a rubber gasket 67 that is mounted between it and the disc 58.

A second cylinder 68 is attached to the lower side of the disc 58 and is formed with openings 69. A lower portion 71 of the cylinder 68 is formed with a central opening through which a shaft 72 extends which carries an enlarged portion 73 at its upper end and a large disc 74 at its lower end. The disc 74 has a rubber gasket 76 which engages the shoulder 29 of the filler neck. A spring 70 is mounted about cylinder 68 between discs 58 and 74.

Figure 4:
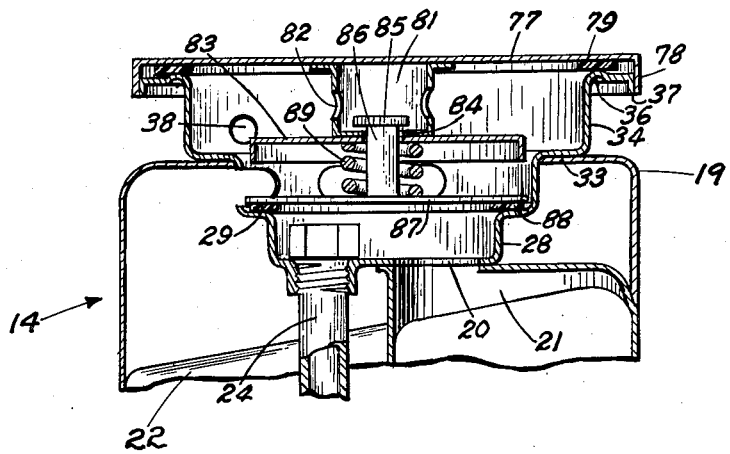
Figure 4 illustrates the upper portion of the radiator of Figure 1 with a filler cap installed which is not pressurized.

Figure 4 illustrates a filler cap for an unpressurized system and comprises a cap 77 which has a lower rim 78 that is detachably connectable to the rim 37. A rubber gasket 79 is attached to the lower portion of the cap 77 and engages the lip 36. A cylinder 81 is attached to the bottom of the cap 77 and is formed with openings 82. A disc 83 is attached to the bottom of the cylinder 81. A guide opening 84 is formed through the disc 83 and the lower portion of the cylinder 81 and a shaft 86 extends therethrough. The upper end of the shaft 86 has an enlarged portion 85 which prevents the shaft 86 from being withdrawn through the hole 84. A disc 87 is attached to the lower end of shaft 86 and has a rubber gasket 88 which mates with the seat 29 of the filler neck. A spring 89 is mounted between the discs 87 and 83.

In operation, coolant is poured into the filler neck and first fills the reservoir through the opening 20 which communicates with the engine cooling chambers and the radiator. After the reservoir is filled, more coolant is added to fill the surge tank through tube 24 and openings 32. It is desirable to fill the radiator with the engine running so that the thermostats in the engine will open and allow all of the cooling passages to be filled.

The structures of Figures 3 and 4 differ only in the type of caps which are used and are filled in the same manner. If a cap such as shown in Figure 4 is to be used, it is placed in the filler neck and the disc 87 presses the gasket 88 tightly against the horizontal ledge 29 thus separating the reservoir and surge tank except through the valve structure 24. The spring 89 holds disc 87 down firmly.

As the engine is operated, the coolant will expand and cause some of it to pass up through the opening 20 and down through the tube 24 into the surge tank. It passes through the opening 43 to reach the surge tank. The ball valve 42 is normally closed and opens only when more fluid is required in the reservoir to satisfy the needs of the engine. When this occurs, the ball valve opens and fluid is drawn past the baffle 39 and by the ball valve 42 and out the lower end of the tube 44. If the surge tank becomes too full, the excess fluid passes through openings 32 above disc 87 and out the overflow pipe 38.

The system of Figure 3 operates similarly to that of Figure 4 except it has been modified to allow the pressure on the surge tank to be maintained above atmospheric. This is accomplished by the disc 58 and gasket 59 which seats against the portion 33 to prevent coolant from the surge tank passing out the overflow tube 38 unless a pressure great enough to overcome the spring 61 occurs is the system. This might require three pounds greater than atmospheric pressure for example. When this occurs, the disc 58 will move upwardly and allow coolant to escape until the pressure falls below the limiting valve. The disc 66 and gasket 67 provide a release valve in the event the pressure in the system falls below a preset minimum pressure. When this occurs disc 66 will move downwardly and allow air from the outside to pass into the surge tank.

The disc 74 and gasket 76 are firmly seated against shoulder 29 by the spring 70.

It is seen that this invention provides two modifications of an improved cooling system for an internal engine. Although it has been described with respect to preferred embodiments, it is not to be so limited as changes and modifications may be made therein which are within the full intended scope as defined by the appended claims.

I claim:

1. An apparatus comprising a radiator top tank divided by a generally horizontal partition so as to form a reservoir and a surge tank, a filler neck attached to the top tank and formed in three cylindrical portions of varying diameter, a filler cap connected to the larger of said cylindrical portions, said larger of said cylindrical portions having an overflow outlet formed therein, the middle cylindrical portion attached to the first of the three cylindrical portions by a ledge and formed with a plurality of openings communicating with the surge tank, the third cylindrical portion attached to the second cylindrical portion by a second ledge, an end portion attached across the bottom of the third cylindrical portion and formed with an opening in communication with the reservoir, a tube mounted to the end portion and in communication with the surge tank, a valve structure mounted between the bottom of the surge tank and the reservoir and providing communication therebetween, said filler cap comprising a first disc with a downwardly extending lip about its outer edge which is detachably connectable to the larger of said cylindrical portions, a cylindrical member attached to the first disc, a shaft extending through an opening formed in said cylindrical member, a second disc attached to the lower end of said shaft and adapted to seat against the second ledge, a spring mounted between the second disc and said cylindrical member and means for preventing said shaft from being removed from the cylindrical member when the filler cap is removed.

2. Apparatus according to claim 1 wherein a first annular gasket is attached to the lower side of said first disc, and a second annular gasket is attached to the lower side of the second disc.

3. An apparatus comprising a radiator top tank divided by a generally horizontal partition so as to form a reservoir and a surge tank, a filler neck attached to the top tank and formed with three cylindrical portions of varying diameter, a filler cap connected to the larger of said cylindrical portions, said larger of said cylindrical portions having an overflow outlet formed therein, the middle cylindrical portion attached to the first of the three cylindrical portions by a ledge and formed with a plurality of openings communicating with the surge tank, the third cylindrical portion attached to the second cylindrical portion by a second ledge, an end portion attached across the bottom of the third cylindrical portion and formed with an opening in communication with the reservoir, a tube mounted to the end portion and in communication with the surge tank, a valve structure mounted between the bottom of the surge tank and the reservoir and providing communication therebetween, said filler cap comprising a first disc with a downwardly extending lip about its outer edge which is detachably connectable to the larger of said cylindrical portions, a second disc flexibly connectable to the first disc and seated against the first ledge, and a third disc flexibly connected to the second disc and seated against the second ledge.

4. An apparatus according to claim 3 wherein said second disc is formed with an opening through which a shaft extends and which carries a small fourth disc on its lower end which is spring biased upwardly and allows air to enter the surge tank when the pressure therein falls below a predetermined value.

5. In apparatus according to claim 4, a first gasket of annular-shape attached to the lower side of the first disc, a second gasket of annular shape attached to the lower side of the second disc and a third gasket of annular shape attached to the lower side of the third disc.

References Cited in the file of this patent

UNITED STATES PATENTS

| 2,406,502 | Lines | Aug. 27, 1946 |
| 2,596,070 | Friend et al. | May 6, 1952 |
| 2,672,131 | Wood | Mar. 16, 1954 |
| 2,732,971 | Holmes et al. | Jan. 31, 1956 |